US008698402B2

(12) United States Patent
Makarov

(10) Patent No.: US 8,698,402 B2
(45) Date of Patent: *Apr. 15, 2014

(54) PULSED ELECTRON SOURCE, POWER SUPPLY METHOD FOR PULSED ELECTRON SOURCE AND METHOD FOR CONTROLLING A PULSED ELECTRON SOURCE

(75) Inventor: Maxime Makarov, Viroflay (FR)

(73) Assignee: Excico Group, Antwerp (BE)

( * ) Notice: Subject to any disclaimer, the term of this patent is extended or adjusted under 35 U.S.C. 154(b) by 791 days.

This patent is subject to a terminal disclaimer.

(21) Appl. No.: 12/812,270

(22) PCT Filed: Jan. 8, 2009

(86) PCT No.: PCT/FR2009/000018
§ 371 (c)(1),
(2), (4) Date: Nov. 23, 2010

(87) PCT Pub. No.: WO2009/106759
PCT Pub. Date: Sep. 3, 2009

(65) Prior Publication Data
US 2011/0057566 A1 Mar. 10, 2011

(30) Foreign Application Priority Data

Jan. 11, 2008 (FR) ...................................... 08 00165

(51) Int. Cl.
*H01J 7/24* (2006.01)
(52) U.S. Cl.
USPC .................................................... 315/111.81
(58) Field of Classification Search
USPC ............. 315/111.21, 111.31, 111.61, 111.71, 315/111.81, 111.91
See application file for complete search history.

(56) References Cited

U.S. PATENT DOCUMENTS

| 3,970,892 | A | 7/1976 | Wakalopulos |
| 4,642,522 | A | 2/1987 | Harvey et al. |
| 4,777,370 | A | 10/1988 | Pigache et al. |
| 4,786,844 | A | 11/1988 | Farrell et al. |
| 7,078,862 | B2* | 7/2006 | Fukuda et al. ........... 315/111.21 |
| 7,185,602 | B2* | 3/2007 | Horsky et al. .......... 118/723 HC |
| 7,244,474 | B2* | 7/2007 | Hanawa et al. ............... 427/562 |
| 7,291,360 | B2* | 11/2007 | Hanawa et al. ............ 427/248.1 |

FOREIGN PATENT DOCUMENTS

| FR | 2 204 882 A1 | 5/1974 |
| FR | 2 312 104 A1 | 12/1976 |
| FR | 2 591 035 A1 | 6/1987 |
| FR | 2 615 324 A1 | 11/1988 |
| JP | 5-211052 A | 8/1993 |
| JP | 8-236053 A | 9/1996 |
| JP | 10-332897 A | 12/1998 |

OTHER PUBLICATIONS

International Search Report, dated Aug. 3, 2009, from corresponding PCT application.

* cited by examiner

*Primary Examiner* — Minh D A
(74) *Attorney, Agent, or Firm* — Young & Thompson

(57) ABSTRACT

The invention relates to a pumped electron source (1) that includes an ionization chamber (4), an acceleration chamber (2) with an electrode (3) for extracting and accelerating primary ions and forming a secondary-electron beam, characterized in that the pumped electron source (1) includes a power supply (11) adapted for applying to the electrode (3) a positive voltage for urging a primary plasma (17) outside the acceleration chamber (2), and a negative voltage pulse for extracting and accelerating the primary ions and forming a secondary-electron beam.

20 Claims, 1 Drawing Sheet

PULSED ELECTRON SOURCE, POWER SUPPLY METHOD FOR PULSED ELECTRON SOURCE AND METHOD FOR CONTROLLING A PULSED ELECTRON SOURCE

The invention relates to the field of pulsed ion sources and devices that use such sources. A pulsed electron source may be used in an electronically excited gas laser or in a magnetohydrodynamic generator.

The publication FR 2 204 882 describes an electron source comprising an enclosure filled with a gas at low pressure provided with an outlet window for electrons, a cold cathode at a high negative voltage in relation to the window for the emission of secondary electrons, an ionisation chamber for the gas, defining a passage for the circulation of the ions to the cathode and the circulation of the secondary electrons to the window, and a screen or grid arranged between the cathode and the ionisation chamber and brought to a potential close to that of the window in order to create, between the grid and the window, and in the ionisation chamber, a substantially equipotential space, and between the grid and the cathode a space with a high potential gradient.

The Applicant has observed that the grid presented particular problems. In fact, on the one hand, the grid has to isolate the two chambers by preventing a parasitic leakage of the primary ions from the ionisation chamber to the acceleration chamber during ionisation. On the other hand, the grid has to be as transparent as possible to allow the electron beam formed in the acceleration chamber during acceleration to pass through with the minimum of losses. The separation can only be partial when some of the ions created in the ionisation chamber penetrate into the acceleration chamber and influence its operation.

The publication FR 2 591 035 proposes using a specially shaped grid to provide a more effective separation between the two chambers. However, the primary plasma penetrates into the acceleration chamber and envelops the cathode. This results in a disruption of the operation of the pulsed high voltage power supply to the cathode, a lengthening of the current pulse of the electron beam and a deterioration in contrast.

The use of a second auxiliary grid brought to a negative potential to drive the free electrons into the ionisation chamber or to a positive potential to drive the positive ions away from the separation boundary between the two chambers requires the use of an additional electrical power supply and therefore complicates the whole of the pulsed electron source. The electron beam formed in the acceleration chamber is forced to pass through grids, which attenuates the electron beam on the one hand and damages the grids on the other. The damage to the grids leads to a restriction in the current of the electron beam and substantially reduces the service life of the grids and hence of the source.

The invention sets out in particular to remedy the drawbacks of the prior art as set out above.

The invention aims particularly to provide an electron source with a long service life, with a low-powered high voltage power supply, with a high electron yield between the cathode and the outlet of the source and with a high contrast of the current of the electron beam.

The pulsed electron source comprises an ionisation chamber, an acceleration chamber provided with an electrode for extracting and accelerating the primary ions and forming a beam of secondary electrons, an electrical power supply configured to apply a positive voltage to the electrode in order to drive a primary plasma out of the acceleration chamber and a negative voltage pulse for extracting and accelerating the primary ions and forming a beam of secondary electrons. The positive voltage applied to the electrode makes it possible to move the positive ions away from the acceleration chamber.

In one embodiment, the electrode is of generally convex cylindrical shape. The electrode may be provided with a flat or concave central part located opposite a slot connecting the ionisation chamber and the acceleration chamber. This assists with the emission of a concentrated electron beam towards the slot.

In one embodiment, the ionisation chamber and the acceleration chamber are connected by an open slot. It is possible to do away with the provision of a grid.

The structure of the source is simplified. The attenuation of the electron beam is reduced. The service life of the source is no longer limited by that of the grid.

In one embodiment, the ionisation chamber and the acceleration chamber are connected by a slot provided between the central part of the electrode and an outlet of the ionisation chamber. The slot is arranged in the path of the electron beam between the electrode and the outlet of the ionisation chamber.

The outlet of the ionisation chamber may be open. Alternatively, the outlet of the ionisation chamber may be provided with at least one grid. The outlet of the ionisation chamber may be closed off by a sheet comprising a metal layer for converting the electrons into X rays. The metal layer may comprise at least one metal with an atomic mass greater than 50.

In one embodiment, the power supply comprises a pulse transformer provided with a primary connected to a direct voltage source via a capacitor. A switch may be arranged between earth and a terminal of the capacitor on the opposite side to the primary. The pulse transformer is provided with a secondary connected to the electrode. An auxiliary voltage source is arranged so as to apply said positive voltage to said electrode. The auxiliary voltage source may be arranged between earth and the electrode. The auxiliary voltage source may be arranged in series with the secondary of the transformer. A capacitor may be arranged in parallel with the voltage source. An electrical power supply may thus ensure generation of a positive bias voltage for the electrode and a negative voltage pulse applied to said electrode. The electrical power supply has a simple and economical structure.

In one embodiment, the power supply comprises a protective device in series with the auxiliary voltage source.

The protective device may comprise at least one diode, a capacitor and/or an inductor.

The auxiliary voltage source may have a voltage of between 100 and 500 volts, preferably between 200 and 400 volts.

In other words, a pulsed electron source comprises an ionisation chamber, an acceleration chamber provided with an electrode for extracting and accelerating the primary ions and forming a beam of secondary electrons, an opening between the ionisation chamber and the acceleration chamber, means for electrically sealing off said opening, and a pulsed electrical power supply for applying a high negative voltage to the electrode for forming an electron beam.

In one embodiment, the ionisation chamber comprises an electrode for the purpose of obtaining an electrical discharge between said electrode and the internal walls of the ionisation chamber forming a hollow cathode. The electrode of the ionisation chamber may take the form of one of more filaments. This electrode may be supplied by an electrical power supply capable of supplying a positive voltage, either pulsed or direct, in the order of several kV, for example between 1 and 10 kV. A pulsed power supply may provide a pulse with a duration of between 1 and 10 microseconds, with a peak current of between 100 and 1000 A, and/or with a voltage of between 5 and 10 kV.

In operation, the ionisation within the ionisation chamber may be obtained by keeping the internal walls of the ionisation chamber forming a hollow cathode connected to earth, by bringing the electrode of the ionisation chamber to a positive voltage of between 1 and 10 kV and by bringing the electrode of the acceleration chamber to a positive potential of between 100 and 500 volts. In this way, the acceleration chamber is protected from the penetration of positive ions from the primary plasma coming from the ionisation chamber through the opening between the said chambers. For a specific operating regime of the source, the voltage applied to the electrode of the acceleration chamber may be calculated as a function of the nature of the gas, notably its atomic mass, the pressure of the gas, the voltage and the current of the electrode of the ionisation chamber, the opening and the depth of the slot between said chambers, etc. Once the primary discharge has been generated in the ionisation chamber, a negative pulsed voltage in the order of −50 to −200 kV is applied to the electrode of the acceleration chamber. The primary positive ions present in the ionisation chamber are then accelerated through the slot towards the electrode of the acceleration chamber. The said electrode of the acceleration chamber is bombarded with positive ions. The bombardment produces secondary electrons which are accelerated by the said negative potential towards the outlet of the source, passing through said slot.

An electrical power supply device for a pulsed electron source comprises means for applying, to an electrode of an acceleration chamber of the source, a positive voltage, then a negative voltage pulse in order to extract and accelerate the primary ions and form a beam of secondary electrons. The positive voltage makes it possible to reduce the quantity of positive ions present in the acceleration chamber prior to the negative voltage pulse. The device may comprise an auxiliary electrical power source connected to the electrode of the ionisation chamber. The device may comprise a voltage-increasing pulsed transformer. The secondary of the transformer may be connected to the electrode of the ionisation chamber in order to apply the said negative voltage pulse.

The control process for a pulsed electron source comprising an ionisation chamber and an acceleration chamber for extracting and accelerating the primary ions and forming a beam of secondary electrons comprises a step of applying to said electrode a positive voltage supplied by an electrical power supply to drive a primary plasma out of the acceleration chamber and a step of applying to said electrode a negative voltage pulse supplied by the electrical power supply in order to extract and accelerate the primary ions and form a beam of secondary electrons.

At the moment when the high negative voltage is applied to the electrode of the acceleration chamber, the area around the electrode finds itself to be substantially free from positive ion plasma. In other words, the plasma is substantially confined within the ionisation chamber. The acceleration chamber is substantially free from plasma. The result of this is that the parasitic capacitance between the electrode and the plasma is very weak by comparison with the parasitic capacitance in the presence of plasma in the acceleration chamber. The desired acceleration voltage can be obtained starting from a significantly lower charging voltage of the electrical power supply to the electrode. The power of the high voltage supply to the acceleration electrode can be reduced, which is a particularly economical measure. The electron beam is subject to less attenuation. The current pulse of the electron beam has a satisfactory contrast.

The present invention will be better understood from a study of the detailed description of a number of embodiments taken as non-restrictive examples and illustrated by the appended drawings, wherein.

Figure 1:
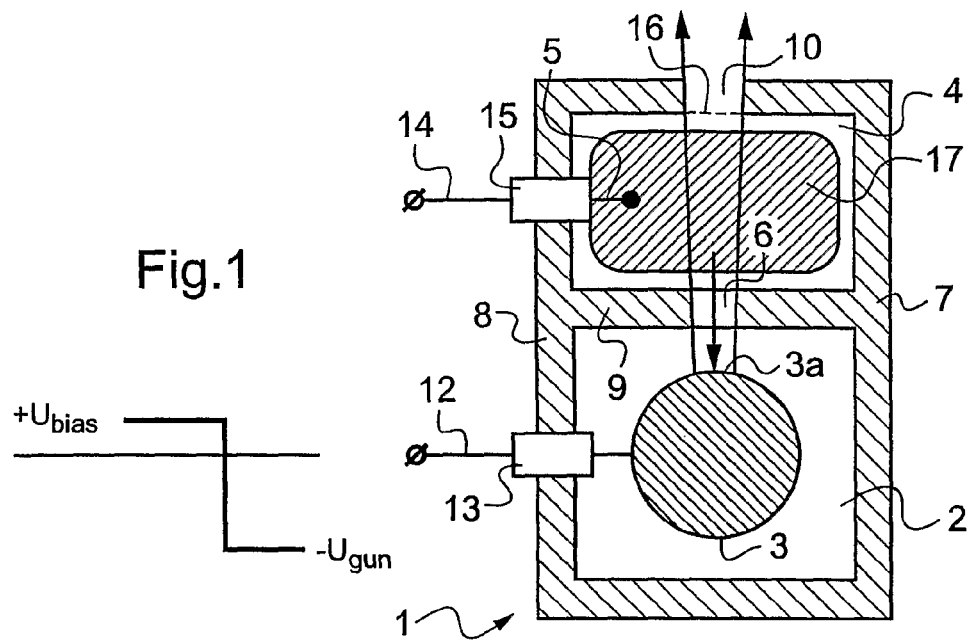
FIG. 1 is a schematic sectional view of a pulsed electron source.

As can be seen from FIG. 1, the pulsed electron source 1 comprises an acceleration chamber 2 in which is arranged an electrode 3, and an ionisation chamber 4 in which is arranged an electrode 5. A slot 6 provides communication between the acceleration chamber 2 and the ionisation chamber 4. The acceleration chamber 2 and ionisation chamber 4 are formed by an enclosure 7 comprising external walls 8 and an internal wall 9 defining the acceleration chamber 2 and ionisation chamber 4. In other words, the acceleration chamber 2 is defined by a number of external walls 8 and the internal wall 9. The ionisation chamber 4 is defined by a number of external walls 8 and by the internal wall 9. The internal wall 9 is shared by the acceleration chamber 2 and ionisation chamber 4. The walls 8 and 9 are made of metal, for example based on stainless steel or brass, optionally covered on the inside with a layer based on aluminium or nickel. The electrode 5 may comprise one or more wires elongated in the main direction of the chamber 4. The wire may be supplied with power at both ends with a view to increasing the homogeneity of the electrical field.

In the plane of the section in FIG. 1, the acceleration chamber 2 and ionisation chamber 4 may be substantially rectangular, while the source may be in the form of a right-angled parallelepiped or tubular in shape. In the latter case, the internal wall 9 may be circular. The source is provided with an outlet 10 in the form of a hole formed in the external wall 8 delimiting the ionisation chamber 4 on the side opposite the internal wall 9. The outlet 10, the slot 6 and the electrode 3 of the acceleration chamber 2 are aligned.

More precisely, the acceleration electrode 3 may take the form of a cylindrical part, which is generally tubular in shape, for example.

Figure 2:
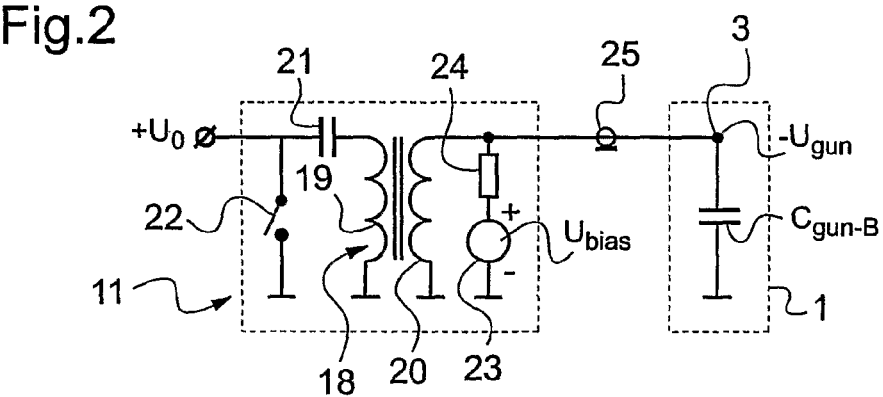
FIGS. 2 and 3 are wiring diagrams of electrical power supplies to the electrode of the acceleration chamber.

The electrode 3 is connected to an electrical power supply 11, see FIG. 2, by an electric cable 12 passing through an external wall 8 via a leaktight insulator 13. The electrode 5 of the ionisation chamber 4 may take the form of one or more filaments and is connected to an outer electrical power supply (not shown) by an electric cable 14 passing through a leaktight insulator 15. The leaktight insulators 13 and 15 may comprise ceramics. The leaktight insulators 13 and 15 provide a gastight seal and an electrical pathway.

During a first step, the enclosure 7 is connected to earth. The electrode 5 of the ionisation chamber 4 is brought to a positive voltage of between 1 and 10 kV. The voltage may be pulsed or direct. The ionisation chamber 4 has been filled beforehand with a gas, for example a noble gas, particularly helium or a mixture of helium and neon at a low pressure in the order of 1 to 20 pascals.

The outlet 10 of the source 1 may be open or, alternatively, provided with a control grid for the beam if the gaseous conditions outside the source 1 are similar to those prevailing in the ionisation chamber 4 and acceleration chamber 2. The outlet 10 may, if desired, be provided with a seal 16. The seal 16 may comprise a sheet of metal or a thin synthetic material with a fine layer of heavy metal. The layer of heavy metal may have a thickness of the order of 1 to 10µ. The layer of heavy metal may comprise one or more metals with an atomic mass of more than 50, for example gold, tantalum, tungsten, etc. The layer of heavy metal makes it possible to convert the electron beam into an X-ray beam.

The voltage applied to the electrode 5 causes an electrical discharge between the said electrode 5 and the walls of the ionisation chamber 4. The discharge generates a plasma 17 in the ionisation chamber 4. As the slot 6 creates a slight discontinuity in the electrical field, the plasma 17 could have a tendency to spread out in the acceleration chamber 2. However, the positive bias $U_{bias}$ applied to the acceleration electrode 3 makes it possible to re-establish relatively regular electrical field lines which prevent, or at least limit, the diffusion of the plasma 17. The plasma 17 comprises positive ions, for example $He^+$, attracted by the weakest electrical potential and on which the positive bias voltage $U_{bias}$ of the acceleration electrode 3 produces a repelling effect. In this way a very considerable reduction is achieved in the passage of positive ions from the plasma 17 into the acceleration chamber 2 during the first phase known as the ionisation phase.

In other words, the process benefits from an electrical sealing of the slot 6. The electrically sealed slot 6 proves particularly advantageous inasmuch as the circulation of harmful elements can be braked substantially, whereas the entry into the slot 6 of desirable elements for passing through is restricted significantly less than when a grid is present.

The second step known as the acceleration step can then take place. A high negative voltage $-U_{gun}$ is applied to the acceleration electrode 3. The positive ions of the plasma 17 are then attracted by the acceleration electrode 3, thus producing an ion bombardment of the acceleration electrode 3. The ion bombardment takes place over a major part of the flattened area 3a of said electrode 3 located opposite the slot 6. The ion bombardment of the acceleration electrode 3, particularly the flattened area 3a, causes the emission of electrons. The electrons undergo a repulsive effect of the acceleration electrode 3 owing to the high negative voltage $-U_{gun}$ and escape through the slot 6 and the outlet 10 of the source 1. The flattened area 3a, the slot 6 and the outlet 10 all being aligned, the electrons accelerated by the acceleration electrode 3 are able to pass through the slot 6, undergoing very slight losses, and through the outlet 10, if appropriate, undergoing losses due to the presence of the seal.

During the application of the high negative voltage $-U_{gun}$ to the acceleration electrode 3, the acceleration chamber 2 is substantially free from plasma. The parasitic capacitance between the acceleration electrode 3 and the enclosure 7 is then very low. The result of this is that less energy is needed in order to obtain the voltage $-U_{gun}$ on the electrode 3. The size of the electrical power supply 11 can be brought down, which is particularly economical. The attenuation of the electron beam is reduced as a result of the open slot 6. Moreover, the slot 6 may have rounded edges. As shown in FIG. 2, the electrical power supply 11 comprises a pulsed transformer 18 provided with a primary 19 and a secondary 20. The primary 19 of the pulsed transformer 18 is connected to earth on the one hand and to a capacitor 21 on the other hand. At the side opposite the primary 19, the capacitor 21 is connected to a voltage source $U_0$ and to a switch 22. The switch 22 is also connected to earth so as to be able to short-circuit the capacitor 21 and the primary 19. The secondary 20 is connected on the one hand to the earth of the power supply and on the other hand to the acceleration electrode 3 of the electron source 1.

The electrical power supply 11 also comprises, mounted parallel to the secondary 20, an auxiliary voltage source 23 supplying the bias voltage $U_{bias}$ and connected on the one hand to the earth of the power supply and on the other hand to the common point between the secondary 20 and the electrode 3. A protective device 24 may advantageously be arranged in series with the auxiliary source 23 with a view to limiting the current circulation. The protective device 24 may comprise at least one diode, a capacitor and/or an inductor. Moreover, a current sensor 25 may be provided at the outlet of the electrical power supply 11 for measuring the current consumed in the ionisation chamber 2.

During the first phase, the switch 22 forms an open circuit. The capacitor 21 is charged to the voltage $U_0$.

The auxiliary voltage source 23 maintains the acceleration electrode 3 at the positive bias voltage $U_{bias}$. To limit the losses in the secondary 20, a diode, not shown, may be arranged between the secondary 20 and the point that is common to the protective device 24 and to the acceleration electrode 3. After the switch 22 has been closed, short-circuiting the capacitor 21 and the primary 19 of the transformer 18, a high negative voltage pulse $-U_{gun}$ is supplied by the secondary 20 of the transformer 18 and applied to the acceleration electrode 3.

In FIG. 2, the electron source 1 has been shown in its equivalent electrical form to the parasitic capacitance $C_{gun}$. The parasitic capacitance $C_{gun}$ is considerably reduced on account of the absence or, failing that, the very small amount, of plasma in the acceleration chamber 2 during the first ionisation step. When plasma is present in the acceleration chamber 2, the polarisation of the plasma generates a strong parasitic capacitance. Thanks to the application of the positive bias voltage $U_{bias}$ which prevents positive ions from the plasma 17 from entering the acceleration chamber 2 during the first step, the acceleration chamber 2 is substantially free from plasma at the moment when the high negative voltage $-U_{gun}$ is applied to the acceleration electrode 3. The parasitic capacitance $C_{gun}$ therefore remains low. The charging voltage $U_0$ of the power supply 11 may be reduced. Alternatively, the transformer ratio of the transformer 18 may be reduced.

Figure 3:
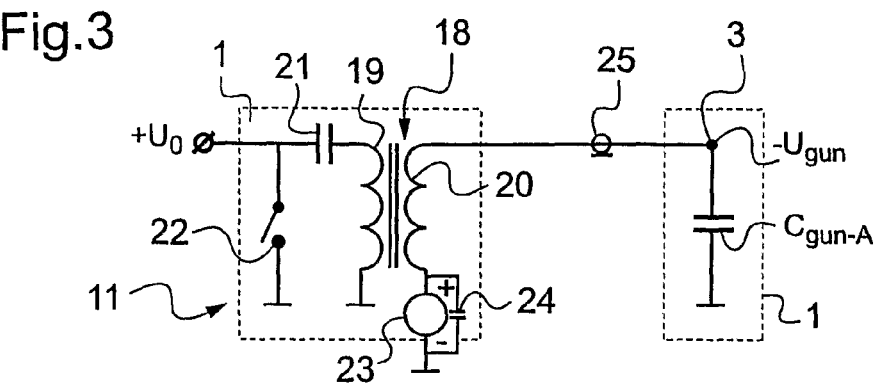

As shown in FIG. 3, the auxiliary source 23 is in series with the secondary 20, for example between earth and the secondary 20. The protective device 24 may comprise a capacitor mounted in parallel with the auxiliary source 23.

A pulsed electron source is provided having a reduced-power electricity supply which is therefore more economical. The electron beam is subject to low losses as it passes between the acceleration chamber 2 and the ionisation chamber 4. The construction of an open slot 6 proves more economical that a grid. The service life of the source is extended, as it is not limited by the service life of a grid between the chambers.

The invention claimed is:

1. Pulsed electron source (1) comprising an ionization chamber (4), an acceleration chamber (2) provided with an electrode (3) for extracting and accelerating the primary ions and forming a beam of secondary electrons, characterised in that it comprises a power supply (11) which is configured so as to apply to said electrode (3) a positive voltage for driving a primary plasma (17) out of the acceleration chamber (2) and a negative voltage pulse for extracting and accelerating the primary ions and forming a beam of secondary electrons.

2. Source according to claim 1, wherein the electrode (3) is of generally convex cylindrical shape and is provided with a flat or concave central part (3a) located opposite a slot (6) connecting the ionization chamber (4) and the acceleration chamber (2).

3. Source according to claim 2, wherein the ionization chamber (4) and the acceleration chamber (2) are connected by an open slot (6).

4. Source according to claim 2, wherein the ionization chamber (4) and the acceleration chamber (2) are connected by a slot (6) arranged between the central part (3a) of the electrode (3) and an outlet (10) of the ionization chamber (4).

5. Source according to claim 2, wherein the power supply (11) comprises a pulsed transformer (18) provided with a primary (19) connected to a direct voltage source via a capacitor (21), a switch (22) being arranged between earth and a terminal of the capacitor on the side opposite the primary, and a secondary (20) connected to the electrode, an auxiliary voltage source (23) being arranged between earth and the electrode in order to apply said positive voltage to said electrode.

6. Source according to claim 1, wherein the ionization chamber (4) and the acceleration chamber (2) are connected by an open slot (6).

7. Source according to claim 6, wherein the ionization chamber (4) and the acceleration chamber (2) are connected by a slot (6) arranged between the central part (3a) of the electrode (3) and an outlet (10) of the ionization chamber (4).

8. Source according to claim 6, wherein the power supply (11) comprises a pulsed transformer (18) provided with a primary (19) connected to a direct voltage source via a capacitor (21), a switch (22) being arranged between earth and a terminal of the capacitor on the side opposite the primary, and a secondary (20) connected to the electrode, an auxiliary voltage source (23) being arranged between earth and the electrode in order to apply said positive voltage to said electrode.

9. Source according to claim 1, wherein the ionization chamber (4) and the acceleration chamber (2) are connected by a slot (6) arranged between the central part (3a) of the electrode (3) and an outlet (10) of the ionization chamber (4).

10. Source according to claim 9, wherein the said outlet (10) is open.

11. Source according to claim 10, wherein the power supply (11) comprises a pulsed transformer (18) provided with a primary (19) connected to a direct voltage source via a capacitor (21), a switch (22) being arranged between earth and a terminal of the capacitor on the side opposite the primary, and a secondary (20) connected to the electrode, an auxiliary voltage source (23) being arranged between earth and the electrode in order to apply said positive voltage to said electrode.

12. Source according to claim 9, wherein the said outlet (10) is provided with at least one grid.

13. Source according to claim 12, wherein the power supply (11) comprises a pulsed transformer (18) provided with a primary (19) connected to a direct voltage source via a capacitor (21), a switch (22) being arranged between earth and a terminal of the capacitor on the side opposite the primary, and a secondary (20) connected to the electrode, an auxiliary voltage source (23) being arranged between earth and the electrode in order to apply said positive voltage to said electrode.

14. Source according to claim 9, wherein the said outlet (10) is closed off by a sheet (16) comprising a metal layer for converting the electrons into X rays.

15. Source according to claim 9, wherein the power supply (11) comprises a pulsed transformer (18) provided with a primary (19) connected to a direct voltage source via a capacitor (21), a switch (22) being arranged between earth and a terminal of the capacitor on the side opposite the primary, and a secondary (20) connected to the electrode, an auxiliary voltage source (23) being arranged between earth and the electrode in order to apply said positive voltage to said electrode.

16. Source according to claim 1, wherein the power supply (11) comprises a pulsed transformer (18) provided with a primary (19) connected to a direct voltage source via a capacitor (21), a switch (22) being arranged between earth and a terminal of the capacitor on the side opposite the primary, and a secondary (20) connected to the electrode, an auxiliary voltage source (23) being arranged between earth and the electrode in order to apply said positive voltage to said electrode.

17. Source according to claim 16, wherein the power supply comprises a protective device (24) in series with the auxiliary voltage source (23).

18. Source according to claim 16, wherein the auxiliary voltage source (23) is mounted in series with the secondary of the transformer.

19. Source according to claim 18, wherein a capacitor is mounted in parallel with the auxiliary source.

20. Method of controlling a pulsed electron source (1) comprising an ionization chamber (4), an acceleration chamber (2) provided with an electrode (3) for extracting and accelerating the primary ions and forming a beam of secondary electrons, comprising a step of applying to said electrode (3) a positive voltage supplied by an electrical power supply (11) for driving a primary plasma out of the acceleration chamber and a step of applying to said electrode (3) a negative voltage pulse supplied by the electrical power supply (11) in order to extract and accelerate the primary ions and form a beam of secondary electrons.

* * * * *

UNITED STATES PATENT AND TRADEMARK OFFICE
CERTIFICATE OF CORRECTION

PATENT NO. : 8,698,402 B2  
APPLICATION NO. : 12/812270  
DATED : April 15, 2014  
INVENTOR(S) : Maxime Makarov Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Twenty-ninth Day of September, 2015

Michelle K. Lee  
*Director of the United States Patent and Trademark Office*